(12) United States Patent
McCarthy

(10) Patent No.: US 7,497,403 B2
(45) Date of Patent: Mar. 3, 2009

(54) HIGH EFFICIENCY TIP VORTEX REVERSAL AND INDUCED DRAG REDUCTION

(76) Inventor: Peter T. McCarthy, 26810 Pine Cliff Pl., Valencia, CA (US) 91381

( * ) Notice: Subject to any disclaimer, the term of this patent is extended or adjusted under 35 U.S.C. 154(b) by 34 days.

(21) Appl. No.: 11/483,935

(22) Filed: Jul. 10, 2006

(65) Prior Publication Data

US 2006/0249630 A1 Nov. 9, 2006

Related U.S. Application Data

(63) Continuation of application No. 10/606,265, filed on Jun. 25, 2003, now Pat. No. 7,207,526.

(60) Provisional application No. 60/392,017, filed on Jun. 26, 2002.

(51) Int. Cl.
*B64C 23/06* (2006.01)
*B64C 3/00* (2006.01)

(52) U.S. Cl. .................................. 244/199.4

(58) Field of Classification Search ............... 244/91, 244/130, 198, 199.2, 199.4
See application file for complete search history.

(56) References Cited

U.S. PATENT DOCUMENTS

| | | |
|---|---|---|
| 1,011,767 A | 12/1911 | Farum |
| 1,063,805 A | 6/1913 | Kause |
| 1,710,673 A | 4/1929 | Bonney |
| 2,123,096 A | 7/1938 | Charpantier |
| 2,210,642 A | 8/1940 | Thompson |
| 2,418,301 A | 4/1947 | Heal |
| 2,576,981 A | 12/1951 | Vegt |
| 2,697,568 A * | 12/1954 | Powers ............ 244/87 |
| 2,846,165 A | 8/1958 | Axelson |
| 3,369,775 A | 2/1968 | Rathorsl |
| 3,411,738 A | 11/1968 | Sargent |
| 3,469,807 A * | 9/1969 | Morris, Jr. ............ 244/90 R |
| 3,480,234 A | 11/1969 | Cornish, III |
| 3,596,854 A | 8/1971 | Heney, Jr. |
| 3,778,383 A | 12/1973 | Kuethe |
| 3,904,151 A | 9/1975 | Rethorst |

(Continued)

FOREIGN PATENT DOCUMENTS

DE  509764  2/1930

(Continued)

OTHER PUBLICATIONS

Walton and Katz "Application of Leading-Edge Vortex Manipulations to Reduce Wing Rock Amplitudes" *Journal of Aircraft* vol. 30, No. 4, pp. 555-558.

(Continued)

*Primary Examiner*—Rob Swiatek

(57) ABSTRACT

Methods for increasing the performance of a foil (100) by using tip droop (102) having an inward directed camber capable of generating an inward directed lifting force on the tip droop (102) in order to control spanwise flow conditions adjacent the tip (112) of a foil (100). Methods for varying the inward lifting shape of a tip droop (102) are provided along with methods for varying the angle of attack and camber of the tip droop (102) as the angle of attack of the foil (100) is changed and as spanwise flow conditions vary.

51 Claims, 8 Drawing Sheets

U.S. PATENT DOCUMENTS

| | | | |
|---|---|---|---|
| 4,017,041 A * | 4/1977 | Nelson | 244/198 |
| 4,108,403 A | 8/1978 | Finch | |
| 4,197,869 A | 4/1980 | Moncrieff-Yeates | |
| 4,293,110 A | 10/1981 | Middleton et al. | |
| 4,323,209 A | 4/1982 | Thompson | |
| 4,382,569 A | 5/1983 | Boppe et al. | |
| 4,444,367 A | 4/1984 | Spillman | |
| 4,705,240 A | 11/1987 | Dixon | |
| 4,722,499 A | 2/1988 | Klug | |
| 4,776,535 A | 10/1988 | Paterson et al. | |
| 4,776,542 A | 10/1988 | Van Dam | |
| 4,949,919 A | 8/1990 | Wajnikonis | |
| 4,975,022 A | 12/1990 | Perry | |
| 5,058,837 A | 10/1991 | Wheeler | |
| 5,072,894 A | 12/1991 | Cichy | 244/91 |
| 5,074,234 A | 12/1991 | Stearns, IV | |
| 5,150,859 A | 9/1992 | Ransick | |
| 5,348,253 A | 9/1994 | Gratzer | |
| 5,356,094 A | 10/1994 | Sylvain | |
| 5,366,177 A | 11/1994 | DeCoux | |
| 5,634,613 A | 6/1997 | McCarthy | |
| 5,738,331 A * | 4/1998 | Woolley | 244/82 |
| 6,422,518 B1 * | 7/2002 | Stuff et al. | 244/199.2 |
| 7,316,371 B2 * | 1/2008 | Wyrembek et al. | 244/91 |

FOREIGN PATENT DOCUMENTS

| | | |
|---|---|---|
| EP | 482832 A | 4/1992 |
| FR | 652 710 A | 3/1929 |
| FR | 768392 | 1/1934 |
| SU | 1239302 A1 | 6/1986 |

OTHER PUBLICATIONS

Treub and Nurlex "Effects of Wing Tip Vortex Flaps" *Journal of Aircraft* vol. 30, No. 4, pp. 557-559.

Gnatz and Marchman "Trailing Edge Flap Influence on Leading Edge Vortex Rap Aerodynamtos", *Journal of Aircraft* vol. 20, No. 2, pp. 165-169.

Rno "An Exptomatory Study of Artao-Efficient Vortext Rep Concepts" *Journal of Aircraft*, vol. 20, No. 12, pp. 1082-1087.

Lamer and Campbell "Vortex Flaps-Advanced Control Devices for Supercruise Fighters" Jan. 1984, Aerospace America.

Newscientist.com—(www.newscientist.com/article.ns?id=dn1033&print=true, accessed Oct. 26, 2005) Precision flying device promises flock of jumbos, dated Jul. 17, 2001.

NASA Aeronautics News—(www.aero-space.nasa.gov/news/vol4_iss4/skysurfing.htm, accessed Oct. 26, 2005) NASA Sky Surfing For Fuel Economy, dated Sep. 2003.

* cited by examiner

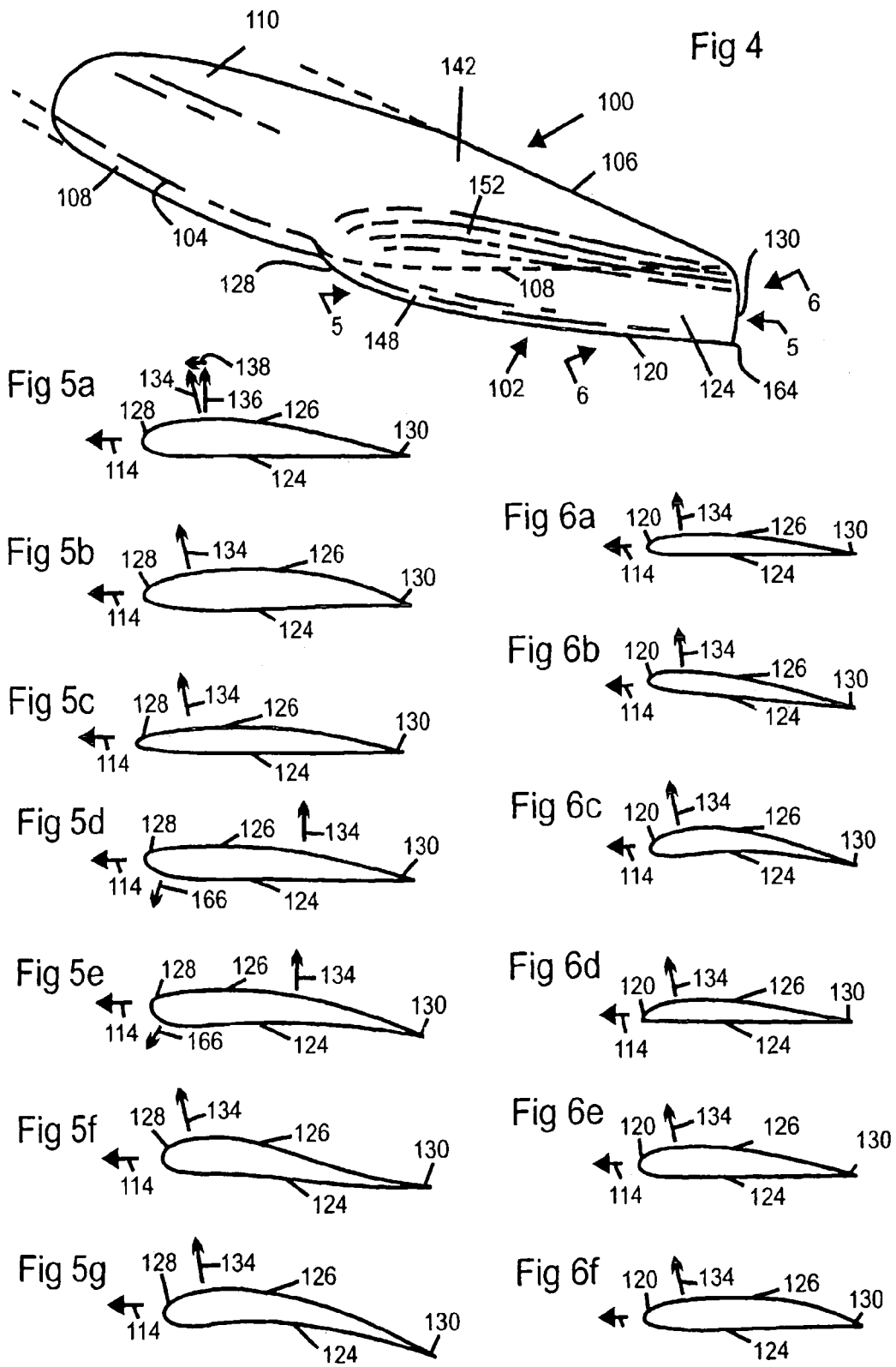

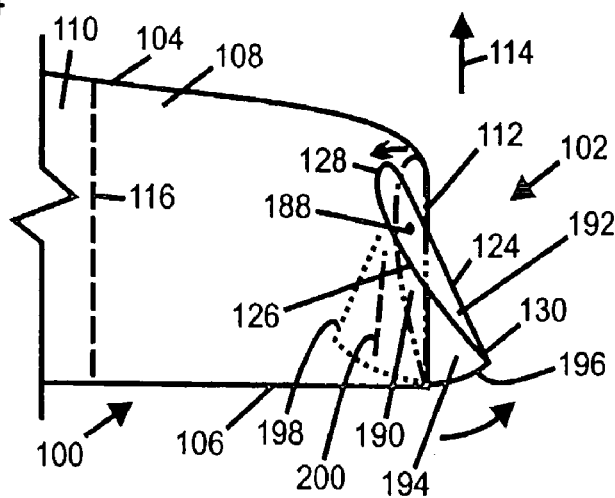
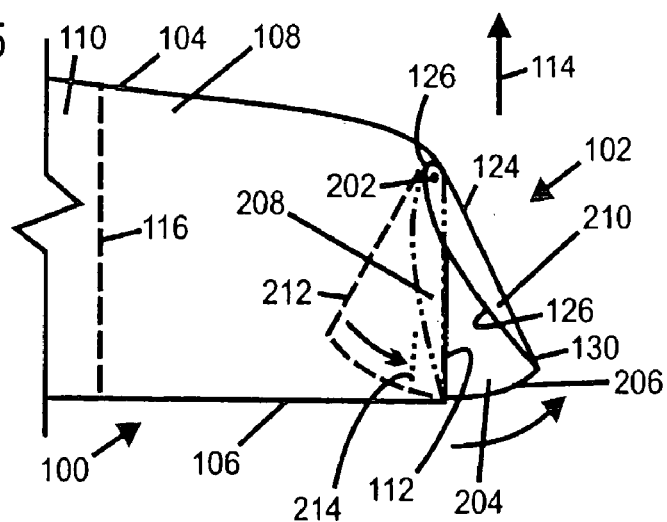
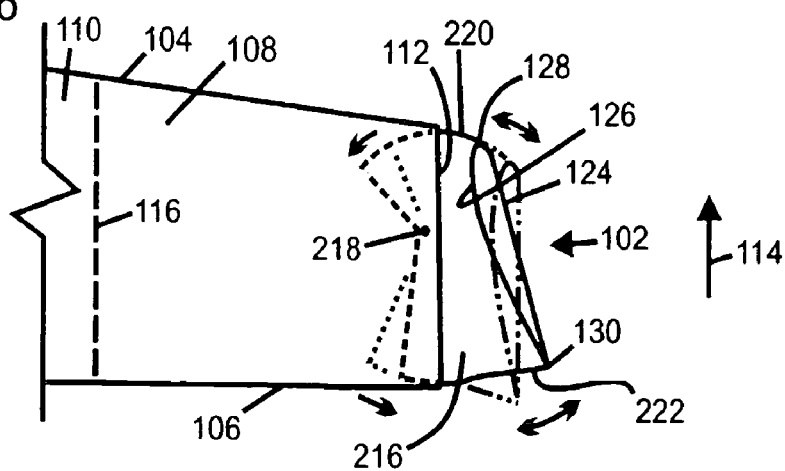

Fig 17
Fig 18
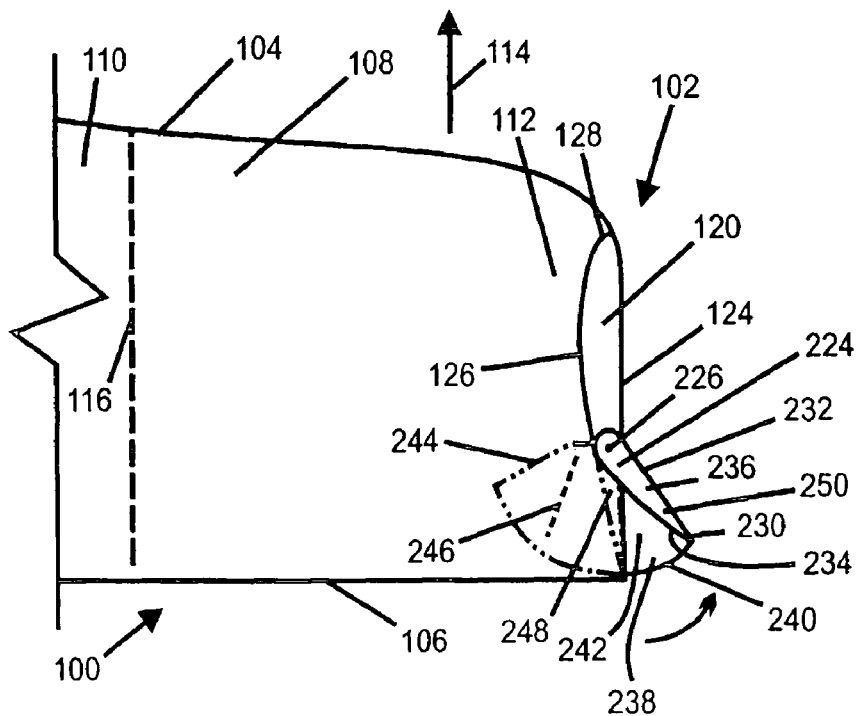
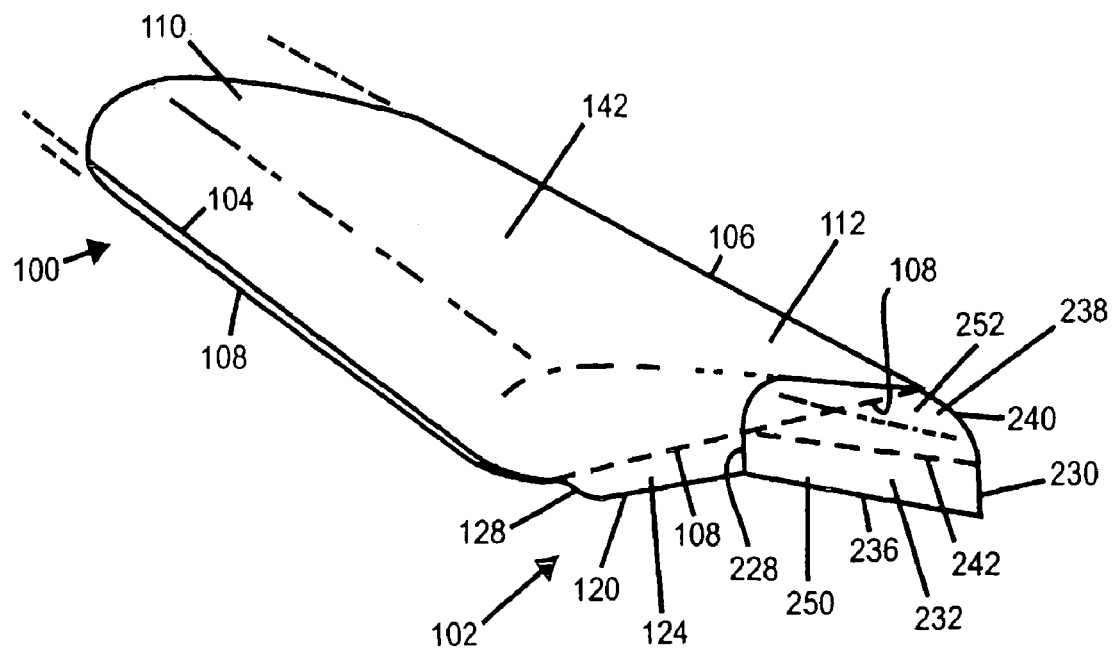

HIGH EFFICIENCY TIP VORTEX REVERSAL AND INDUCED DRAG REDUCTION

This application is a continuation of U.S. patent application Ser. No. 10/606,265, filed Jun. 25, 2003, now U.S. Pat. No. 7,207,526 titled HIGH EFFICIENCY TIP VORTEX REVERSAL AND INDUCED DRAG REDUCTION, which claims the benefit under 34 U.S.C. § 119(e) of U.S. Provisional application No. 60/392,017, filed Jun. 26, 2002, titled HIGH EFFICIENCY TIP VORTEX REVERSAL AND INDUCED DRAG REDUCTION. The entire contents of this provisional application are hereby incorporated by reference herein and made a part of this specification.

BACKGROUND

1. Field of Invention

This invention relates to foil type devices as well as vortex generators and vortex attenuators, specifically to such devices which create pressure differentials through a fluid medium.

2. Description of Prior Art

Numerous prior art attempts to reduce induced drag include the use of winglets to block undesirable cross flow conditions and the formation of tip vortices. Even the best winglets only reduce the tip vortex by about 20% maximum, and therefore 80% or more of the problem still exists. In addition, prior winglets add significant weight, additional surface drag, profile drag, parasitic drag and induced drag from vortices formed at the tips of the winglets, and these factors often reduce the net benefits to around 2% to 3% improvements. These devices typically work at only one flight speed and angle of attack.

U.S. Pat. No. 5,634,613 to McCarthy (1997) uses an anhedral tip droop which is mounted at a divergent angle of attack to produces a counter vortex. Methods are not disclosed for maximizing net benefits by minimizing downward lift, profile drag, and flow separation.

OBJECTS AND ADVANTAGES

Accordingly, several objects and advantages of the present invention are:

(a) to reduce outward spanwise flow adjacent the high pressure surface with low levels of drag;

(b) to provide low drag vortex generators that reduce flow separation along the low pressure surface of the vortex generator;

(c) to provide low drag vortex generators near the tip of a foil which create a counter vortex with reduced flow separation and drag;

(d) to provide reduced induced drag with reduced amounts of added drag, structure and weight;

(e) to provide low drag vortex generators having adjustable angles of attack;

(f) to provide low aspect ratio foil shaped vortex generators for reduced flow separation;

(g) to provide methods improving the performance of a foil by controlling spanwise flow with a tip foil mounted substantially normal to the plane of the foil, such tip foil having an asymmetrical foil shape that has greater camber on the inward surface of the tip foil than on the outer surface of the tip foil;

(h) to provide methods for providing a streamlined pivotal connection of a low drag vortex generator to a foil, such vortex generator being arranged to pivot around an axis that is normal to the plane of the foil; and (i) to provide methods for reducing adverse flow conditions around a foil with relatively low costs in drag and lift.

Still further objects and objectives will become apparent from a consideration of the ensuing description and drawings.

DRAWING FIGURES

FIG. 4 shows a perspective view of the foil of FIG. 1.

FIGS. 5a to 5g show a variety of cross sectional shapes than may exist along the line 5-5 in FIG. 4.

FIGS. 6a to 6f show a variety of cross sectional shapes than may exist along the line 6-6 in FIG. 4.

FIG. 14 shows a bottom view of an alternate embodiment foil having an inward cambered pivoting tip.

FIG. 15 shows a bottom view of an alternate embodiment foil having an inward cambered pivoting tip.

FIG. 16 shows a bottom view of an alternate embodiment foil having an inward cambered pivoting tip.

FIG. 17 shows a bottom view of an alternate embodiment foil having an inward cambered vertical foil having a pivoting rearward portion.

FIG. 18 shows a perspective view of the foil of FIG. 17.

DESCRIPTION AND OPERATION—FIG. 1 to 11

Figure 1:
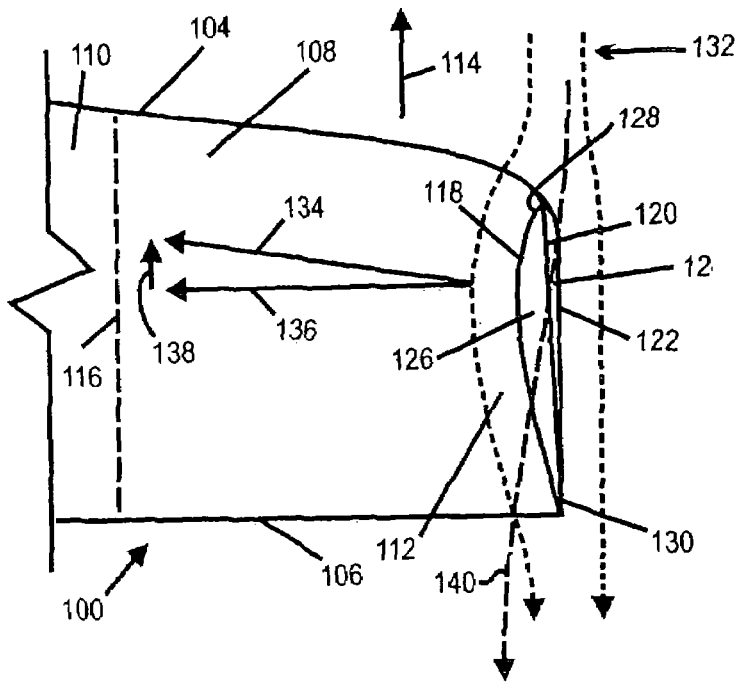
FIG. 1 shows a bottom view of a foil having an asymmetrical foil shaped tip droop having an inward directed camber.

FIG. 1 shows a bottom view of a foil 100 having a foil shaped tip droop having an inward directed camber. Foil 100 has a leading edge 104, a trailing edge 106, a high pressure surface 108, an inward foil portion 110, and a tip portion 112. Foil 100 is moving in a foil direction 114 relative to a fluid medium. A dotted line between leading edge 104 and trailing edge 106 shows a chord line 116 that is significantly aligned with foil direction 114. Tip droop 102 has droop root portion 118, a droop lower end 120, a droop outer end 122, an outer droop surface 124, an inward droop surface 126, a droop leading edge 128, and a droop trailing edge 130. In this embodiment, droop lower end 120 is seen to be oriented at a divergent angle to chord line 116; however, droop lower end 120 may have any alignment including any degree of divergence, any degree of convergence to chord line 116, may be parallel to chord line 116, may be straight, curved, convexly curved, concavely curved, both convexly and concavely curved, or may have any shape, alignment, or contour relative to chord line 116. Outer droop surface 124 may be straight, sloped, canted, angled, convex curved, concave curved, multi-faceted, or sinuous in a chordwise and, or spanwise and, or vertical direction relative to foil 100.

An oncoming flow 132 is shown with two arrows made with broken lines that the flow path of the fluid medium around tip droop 102. Because inward droop surface 126 has more camber than outer droop surface 124, the portion of oncoming flow 132 which flows around inward droop surface is seen to flow a longer distance that the portion of oncoming flow 132 that flows around outer droop surface 124. This causes the portion of oncoming flow 132 flowing around inward droop surface 126 to experience a relative decrease in pressure to create a tip droop lift vector 134 which has a spanwise component of lift 136 and a chordwise component of lift 138. Because chordwise component of lift 138 occurs in the direction of foil direction 114, chordwise component of lift 138 is a forward thrust vector which can improve the performance of foil 100. Preferably some degree of forward thrust is created; however, chordwise component of lift can be zero or can be directed in the opposite direction of foil direction 114. Preferably, any negative costs can be relatively small in comparison to the overall improvements in performance made possible by tip droop 102.

In this embodiment, droop outer end 122 is seen to be parallel to chord line 116. The increased camber along inward droop surface 126 permits the formation of a low pressure field within the fluid medium along inward droop surface 126 while droop outer end 122 is parallel to chord line 116 and direction of travel 114. This allows droop outer end 122 to have zero divergence to oncoming flow 132 and therefore reduces profile drag by allowing tip droop 102 to have reduced frontage and displacement through the fluid medium so that it is more like a bullet and less like a barn door. Whereas the prior art tip droop disclosed in U.S. Pat. No. 5,634,613 to McCarthy uses an angle of attack around a divergent alignment to create a pressure differential, the methods of the present invention exploit camber to create a desired pressure differential in an amount effective to permit the angle of attack around a divergent alignment to be significantly reduced or even eliminated entirely. This allows profile drag and, or parasitic drag, and or surface drag and or transitional flow from low pressure surface separation to be reduced. The presence of asymmetrical inward camber on tip droop 102 can also allow the overall size of tip droop 102 to be reduced since the asymmetrical camber permits the difference in pressure to be formed more efficiently between inward droop surface 126 and outer droop surface 124 and therefore, less surface area may be used.

Tip droop 102 may extend any distance below foil 100. It is preferred, but not required, that such a distance is sufficient to create an improvement in performance and is sufficiently limited to reduce drag and weight penalties relative to the benefits gained. By increasing the distance between droop root portion 118 and droop lower end 120, the size of both outer droop surface 124 and inward droop surface 126 can be increased to create an increase in the pressure difference between such surfaces. This would increase the strength of both tip droop lift vector 134 and inward spanwise flow 140. An inward spanwise flow 140 is seen to flow inward below droop lower end 120. This is created as the relatively higher pressure fluid along outer droop surface 124 curls around droop lower end 120 and flow toward the reduced pressure along inward droop surface 126. Inward spanwise flow 140 is arranged to oppose outward spanwise expansion of the high pressure field existing along high pressure surface 108 of foil 100 in an amount effective to reduce, block or reverse such outward spanwise expansion below tip droop 102 during use. This can significantly improve performance by forcing the high pressure field to escape only behind trailing edge 106 rather than spilling around tip portion 112 of foil 100. The airfoil shape, angle of attack, contours and profile of tip droop 102 may also be arranged so that inward spanwise flow 140 may form in the wake behind tip droop 102 rather than below tip droop 102. In alternate embodiments, tip droop 102 may be arranged to permit the presence of inward spanwise flow 140 to be shown only as a reduction in outward spanwise flow below tip droop 102. This would create a reduction in a standard induced drag tip vortex rather than create a counter vortex.

It is preferred that inward droop surface 126 has sufficient camber to permit lift vector 134 to form relative to any spanwise flow conditions existing around tip portion 112 during use. It is preferred that inward droop surface 126 has sufficient camber to permit inward spanwise flow 140 to form relative to any spanwise flow conditions existing around tip portion 112 during use. Foil tip 102 may employ any foil shape including asymmetrical airfoil shapes, semi-symmetrical airfoil shapes, symmetrical airfoil shapes, asymmetrical airfoil shapes having at least one flat side, or any suitable shape. Tip droop 102 may be of any size or shape. It may exist only within the boundary layer, may extend a small distance beyond the boundary layer, may extend a small distance into the free stream, may extend a significant distance into the free stream. Tip droop 102 may have any length, width, depth, thickness, height, degree of camber, shape of camber, contour, alignment, angle, degree of divergence, degree of convergence, degree of curvature.

Behind trailing edge 106, the portion of oncoming flow 132 that has flowed around inward droop surface 126 is seen to cross the path of inward spanwise flow 140. This shows that inward spanwise flow 140 can form a vortex in the wake behind foil 100. The camber and, or orientation of tip droop 102 can be arranged to form such a vortex close to trailing edge 106, far back in the wake behind trailing edge 106, or along inward droop surface 126. Such a vortex is arranged to spin in the opposite direction of a standard induced drag vortex. Such a vortex may be used to counter, inhibit, reverse, or displace the formation of a standard induced drag vortex.

Figure 2:
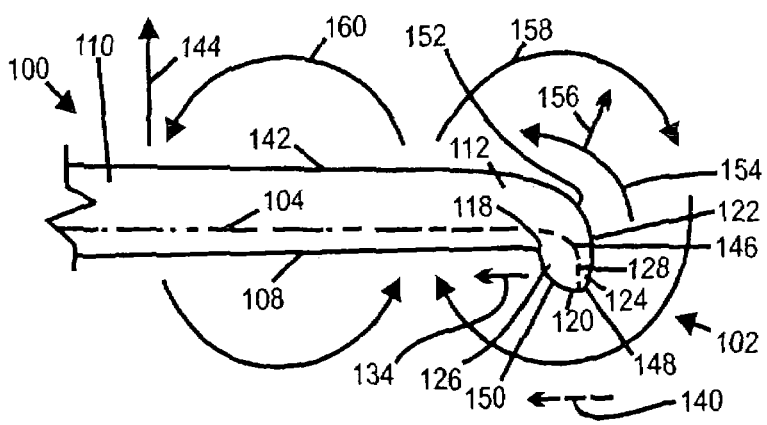
FIG. 2 shows a front view of the foil of FIG. 1.

FIG. 2 shows a front view of the foil of FIG 1. In FIG. 2, Foil 100 has a foil low pressure surface 142 and a foil lift vector 144 is generated by foil 100 and is shown by an arrow above foil low pressure surface 142. In this particular embodiment, tip droop 102 is seen to have a relatively thick airfoil shape; however, any level of thickness or thinness may be used. Leading edge 104 is seen to have leading edge transition 146 that curves downward to form droop leading edge 128 which terminates at droop lower end 120. Leading edge transition 146 may be gradual, smoothly curved, abrupt, sharply curved, stepped, sharply angled, lightly fared, greatly fared, relatively long, relatively short, or any desired shape or contour. In this embodiment, the curved transition of leading edge 104 to droop leading edge 128 allows the portions of tip droop 102 that are inward of droop lower end 120 to have greater camber above leading edge transition 146 than below leading edge transition 146 to allow foil tip 102 to create lift in the same direction as foil lift vector 144 for increased efficiency. Droop leading edge 128 is seen to be closer to droop outer surface 122 than droop inward surface 126 to create increased camber along droop inward surface 126 to help create tip droop lift vector 134. Because droop inward surface 126 and droop outer surface 122 are oriented in a substantially perpendicular angle to the plane of foil 100, tip droop lift vector 136 is significantly perpendicular to foil lift vector 144 and therefore droop lift vector 136 does not significantly oppose foil lift vector 144. This creates a significant improvement over prior art tip droops which can create a downward lifting force that creates a net reduction in the overall lifting force created by a foil. While it is preferred that tip droop 102 generate a lifting force that is sufficiently perpendicular to foil lift vector 144 in an amount effective to have minimal or no significant net reduction on foil lift vector 144, tip droop lift vector 136 may be oriented in any direction relative to foil lift vector 144.

Droop outer end 122 is seen to have a droop lower end outer corner 148 which is convexly curved toward droop lower end 120. In this embodiment, corner 148 is convexly curved to reduce drag and promote smooth flow as inward spanwise flow 140 forms below droop lower end 120. In alternate embodiment, corner 148 may have a relatively large or small curvature, large or small radius, or may have no curvature to form a sharp corner or a faceted corner. In alternate embodiments, droop lower end 120 can exist directly below droop outer surface 122 so that droop lower end 120 becomes corner 124.

In this embodiment, inward droop surface 126 is seen to have an inward lower end corner 150 which is convexly curved. This is arranged to permit inward spanwise flow 140 to curve upward around corner 150 to promote attached flow and to assist with the formation of a low pressure field along inward droop surface 126. In alternate embodiments, corner 150 may have any degree of curvature, may have any radius, may be a sharp corner, may be concavely curved or may be faceted.

Inward droop surface 126 is seen to join high pressure surface 108 of foil 100 at droop root portion 118, which is seen to be concavely curved. It is preferred that root portion 118 is concavely curved or fared to reduce parasitic drag for increased efficiency and reduced drag penalties. However, droop root portion 118 may have any degree of curvature or radius, may be concavely curved, sharply-angled, sharply cornered, permanently attached, fixed, or movable.

Tip droop 102 may be molded, formed integrally, bolted, riveted, glued, adjustably mounted, removably attached, or pivotally attached in any manner to foil 100 and can be made with composite materials, metals, plastics, thermoplastics, flexible materials, rigid materials, reinforced materials, fabric materials, resins, or any suitable material for a given application. In aircraft applications, tip droop 102 may be formed integrally with tip mounted navigation lights, may be an inward cambered navigation light housing, or such navigation lights may be mounted to tip droop 102 in any suitable manner. In aircraft applications designed to land and take off on bodies of water, tip droop 102 can extend down to form stabilizing floats for supporting the wing tips. Tip droop 102 can also be used to increase the efficiency of ground effect devices and vehicles.

Outer droop surface 122 is seen to have an outer surface outer corner 152 which is convexly curved in this embodiment. Preferably, corner 152 is curved to encourage the fluid medium to from the higher pressure surface adjacent outer droop surface 122 toward foil low pressure surface 142 to permit an inward low pressure surface spanwise flow 154 to form above corner 152. The curved flow path of spanwise flow 154 above corner 152 increases the distance the spanwise flow 154 must travel and permits a constructive lift vector 156 to form above tip droop 102. Lift vector 156 is significantly aligned with foil lift vector 144 and therefore creates constructive vector addition for a net increase in the total lift on foil 100. In alternate embodiments, corner 152 may have any degree of curvature, camber, radius, may be a sharp corner, perpendicular corner, obtuse corner, acute corner, faceted corner, concavely curved region or may include a moveable, adjustable, pivotal or removable connection. In addition, any contour or degree of curvature of corner 152 can vary in any manner along the chord of tip portion 112 of foil 100.

Inward spanwise flow 140 beneath tip droop 102 creates a counter vortex 158 in the wake behind foil 100 and tip droop 102. Counter vortex 158 is seen to spin in the opposite direction to an induced drag type vortex 160. Vortex 160 is located inward of tip 102 due to the formation of counter vortex 158. The significantly horizontal alignment of tip droop lift vector 134 permits spanwise flow 140 and counter vortex 158 to form efficiently while minimizing or eliminating the formation of negative lifting forces which oppose foil lift vector 144. The inward asymmetrically cambered shape of inward droop surface 126 permits the plane of tip droop 102 to have a reduced or even eliminated degree of divergence for reduced profile drag. The strategic use of airfoil contours to maximize pressure differential, reduce flow separation and encourage smooth flow, permit tip droop 102 to form spanwise flow 140 and counter vortex 158 with minimal cost to performance in comparison to the performance benefits gained. It is preferred that the methods of the present invention are applied to maximize performance gains while minimizing any negative costs for a net positive improvement in efficiency and performance. Preferably, the formation of counter vortex 158 is arranged to encourage spanwise flow 156 to flow into the upper portion of vortex 160 to further increase the distance spanwise flow 154 must travel for a further decrease in pressure and a further increase in the magnitude of lift vector 156. Preferably, the contour of corner 152 is strategically arranged to maximize lift vector 156, minimize or eliminate undesirable flow separation and maximize the effective surface area of foil 100.

In alternate embodiments, any or all of the surfaces and, or edges of tip droop 102 may be varied, shaped or configured in any manner. For example, inward droop surface 126 can be concave while still having inward directed asymmetrical camber. Inward droop surface can also include both convex and concave curvatures in a vertical direction and to any degree or combination of contours. Droop lower end 120 may be curved, pointed, rounded, blunt, sharp, pointed, square, cornered, faceted, convex, concave, spurred, adjustable, extendable, movable, or configured in any manner. The interior structure of tip droop 102 can be solid, hollow, honeycombed, strutted, ribbed, made with foam, molded from lightweight material, used to function as fuel tanks or weapons structures, or constructed in any suitable manner. The exterior surfaces of tip droop 102 can be smooth, matt finished, glossy, rough, channeled, multi-faceted, angled for stealth avoidance of radar reflections, covered with radar absorbent material, flexible, yieldable, resilient, bullet proof, heated, arranged to avoid ice formation, or configured in any manner. Tip droop 102 may have any aspect ratio, high aspect ratio, low aspect ratio, any chord length, any dimension away from the plane of foil 102, any surface area, any shape contour or size.

Figure 3:
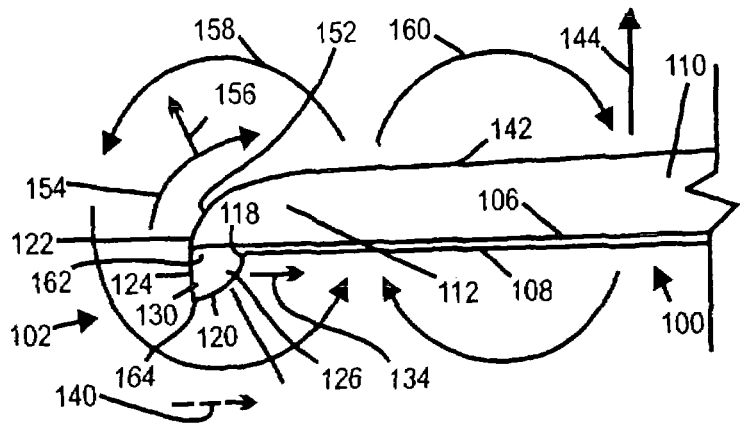
FIG. 3 shows a rear view of the foil of FIG. 1.

FIG. 3 shows a rear view of the foil of FIG. 1. In FIG. 3, trailing edge 106 is seen to form a substantially perpendicular angle with droop trailing edge 130. In alternate embodiments, any angle can be used including obtuse and acute angles. Preferably, this angle is arranged to permit droop lift vector 134 to have minimal or no downward lift that could oppose or reduce foil lift vector 144. A trailing edge transition 162 is seen to be fared with a slight curvature. Any degree of curvature or faring as well as any lack of curvature or faring can occur along transition 162. A tip droop trailing tip 164 is shown as a sharp corner between droop trailing edge 130 and droop lower end 120. Trailing tip 164 can form a sharp corner, a rounded corner, a facet corner, an acute angle, an obtuse angle, can terminate forward of foil trailing edge 106 or can extend rearward to any distance behind foil trailing edge 106. Inward droop surface 126 is convexly curved to increase the formation of droop lift vector 134 as well as reduce flow separation and transitional flow for inward spanwise flow 140. Preferably, inward droop surface 126 has inward directed lift enhancing camber in both spanwise and chordwise directions relative to foil 100. This is to maximize pressure reduction along inward droop surface 126 as the fluid medium flows along inward droop surface 126 from the leading edge (not shown) of foil 100 toward trailing edge 106 of foil 100, and also maximizes pressure reduction along inward droop surface 126 as inward spanwise flow 140 flows around droop lower end 120 from outer surface 124.

The lower portions of vortex 158 and vortex 160 are seen to spin in a converging manner that creates an upwash field behind foil 100. This upwash field is arranged to push against foil 100 in the direction of foil lift vector 144 for increased performance. The inward asymmetrical camber of inward droop surface 126 is arranged to create this beneficial upwash field with significant reductions in profile drag, transitional flow, flow separation, and angle of attack to tip droop 102. It is preferred that such reductions in drag penalties and negative lift penalties permit the benefits of inward spanwise flow 140 to create a net improvement in performance, and preferably, such a net improvement in performance may be maximized by adjusting the inward camber and overall shape of tip droop 102.

FIG. 4 shows a perspective view of the foil of FIG. 1. Droop leading edge 128 is seen to be swept back. In high speed applications that approach or exceed the speed of sound, a swept back orientation is preferred for foil tip 102 to permit efficient subsonic, transonic or supersonic flow as foil tip 102 generates an inward spanwise flow (not shown) below droop lower end 120, or in the wake behind foil tip 102. In alternate embodiments, droop leading edge 128 may be unswept, backward swept or forward swept to any degree. In this embodiment, droop lower end 120 is curved and backward swept; however, droop lower end 120 may be straight, bent, angled, multi-directional, descending, ascending, convex curved, concave curved, or any shape or alignment. The broken lines along corners 152 and 148 show curvature in these regions used in this embodiment. Any degree of curvature or lack of curvature can be used. The dotted line existing behind tip droop 102 is a view of high pressure surface 108 of foil 100 for showing the cross sectional shape of foil 100 in this embodiment. Alternate embodiments may use any shape.

Foil 100 may have any shape or form. Foil 100 may use any airfoil or hydrofoil cross section. Such cross airfoil or hydrofoil sections may include asymmetrical, symmetrical, cambered, undercambered, reflex, flat bottomed, flat symmetrical, thick, thin, long, short, or any other shape. Foil 100 may be a fixed, pivoting, rigid, flexible, oscillating, reciprocating, rotating foil, or any foil type device. Foil 100 may have any plan form shape, aspect ratio, size or application.

FIGS. 5a to 5g show a variety of alternate cross sectional shapes than may exist along the line 5-5 in FIG. 4 in order to illustrate a few examples of the unlimited variations in lift generating foil shapes that can be used. FIG. 5a shows the essentially the foil shape as shown in foil tip 102 in FIG. 1 for comparative purposes. The alternate embodiment in FIG. 5b, inward droop surface 126 is seen to have a maximum thickness that is larger in dimension and farther back toward droop tip 130. Outer droop surface 124 is seen to have an increased outward camber. FIG. 5c shows an alternate embodiment in which a thinner airfoil shape is used and the maximum thickness is farther back. In the alternate embodiment shown in FIG. 5d, the rearward portions of outer droop surface 124 and inward droop surface 126 form an inward asymmetrical airfoil shape to create droop lift vector 134, while at the same time the forward portion of outer droop surface 124 adjacent droop leading edge 128 has an asymmetrical outward directed camber to form a tip droop outward lift vector 166. Inward directed lift vector 134 is seen to be larger than outward lift vector 166 so that an inward directed spanwise flow condition (not shown) is formed adjacent to tip droop 102 or in the wake behind foil tip 102. The formation of outward lift vector 166 is purposely formed adjacent droop leading edge 128 in order to encourage an outward spanwise flow condition (not shown) to flow outward around droop leading edge 128 and the forward portions of outward droop surface 124 so that the fluid medium adjacent the leading portions of tip droop 102 is encouraged accelerate smoothly around the forward portions of outward droop surface 124 from droop leading edge 128 to foil low pressure surface 142 in an attached manner for increased forward lift. Outward lift vector 166 is seen to have forward angled orientation to show that a chordwise component of this vector is pointing forward in the direction of foil direction 114. The alternate embodiment shown in FIG. 5e is similar to that shown in FIG. 5d except that the forward portion of outward droop surface 124 has increased outward camber and the rearward portion of outward droop surface 124 and inward droop surface 126 have increased inward directed asymmetrical camber, including a concavely shaped outward droop surface 124 near droop trailing edge 130. The embodiment in FIG. 5f is seen to have a reflex airfoil shape. The embodiment in FIG. 5g is seen to have an "undercambered" shape in which inward droop surface 126 has a convex curved shape and outward droop surface 124 has a concave curved shape. In alternate embodiments, any airfoil shape may be used and such airfoil shape may be oriented at any angle of attack.

FIGS. 6a to 6f show a variety of cross sectional shapes than may exist along the line 6-6 in FIG. 4. Preferably, an airfoil shape is also created in an angled direction such as seen with the angled orientation of the line 6-6 in FIG. 4. An airfoil shape along this upward angled orientation can permit tip droop 102 to form an inward lift vector (not shown) with increased efficiency when foil 100 is at high angles of attack and, or when any upward flow conditions are occurring. If foil 100 were at a higher angle of attack in which the line 6-6 would represented the direction of the oncoming flow, then an inwardly directed airfoil shape along the line 6-6 can increase the efficient formation of inward lift and an inward spanwise flow condition (not shown). The line 6-6 is used for illustration and an inward lifting airfoil shape can be created along any angle or angles of alignment.

In FIG. 6a, droop lower end 120 is seen to form the leading edge of this angled airfoil shape and droop lift vector 134 is seen to form along inward droop surface 126. In FIG. 6b, the airfoil shape is seen to be oriented at a divergent alignment relative to foil direction 114. The embodiment in FIG. 6c has an undercambered shape in which outward droop surface 124 is concavely curved. In the embodiment in FIG. 6d, outward droop surface 124 is flat and droop lower surface 120 has a sharp corner adjacent to outward droop surface 124. Such a sharp corner can be used to create a small separation bubble along inward droop surface 126 near droop lower end 120 to permit reattached flow to occur further downstream along inward droop surface 126 so that lift is increased and stall conditions are reduced or avoided. FIG. 6e shows a relatively thick airfoil section and FIG. 6f shows a thick airfoil section with the point of maximum thickness moved back toward droop trailing edge 130. Any airfoil shape many be used in any chordwise, vertical, spanwise, or angled direction and in any combination. Preferably, foil shapes are selected to created inward pressure differential while reducing total drag and reducing downward lift that can oppose the total positive lift on the foil; however, some degree of drag and some degree of downward force can be created if desired.

FIG. 7a to 7e show perspective views of various alternate forms of the tip droop shown in FIG. 4. In the alternate embodiment in FIG. 7a, tip droop 102 is relatively large and covers the entire chord of foil 100. Droop leading edge 128 slopes downward all the way to trailing tip 164 to form a downwardly angled rearwardly swept leading edge. In this embodiment, droop trailing edge 130 is seen to be crescent shaped; however, any shape can be used. Outward droop surface 124 is seen to have a relatively large surface area that increases in a rearward direction. This rearward increase in surface area can have a stabilizing effect by permitting the formation of an inward directed lift vector (not shown) to be strongest adjacent to the rearward portions of foil 100. The method of arranging a major portion of the surface area of tip droop 102 to be adjacent trailing edge 106 of foil 100 can be used to increase efficiency, stability and reduce drag. Preferably, the surface area of tip droop 102 is increased in a rearward direction to correspond with the increased potential for undesirable outward spanwise flow conditions toward the rearward portions of foil 100 adjacent to tip droop 102. Outward droop surface 124 can be straight, flat, curved, convexly curved, or concavely curved in any direction including spanwise, chordwise, vertical, or angled. In alternate embodiments, droop lower end 120 can have any alignment relative to the chordwise alignment of foil 100 including downward swept, upward swept, downward and upward swept, upward and downward swept, curved, straight, convex curved, concave curved or sinuous.

Figure 7A:
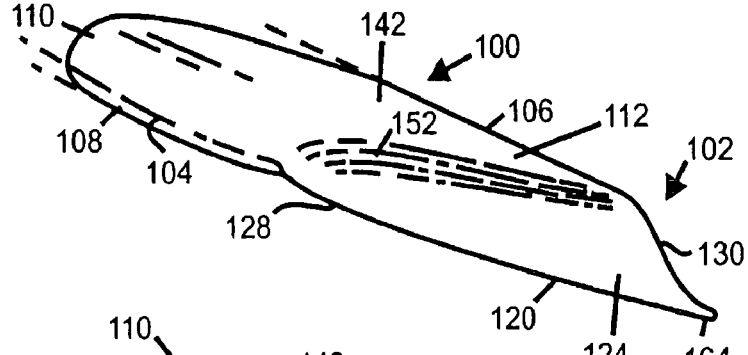
FIGS. 7a to 7e show perspective views of various alternate forms of the foil tip shown in FIG. 4.
Figure 7B:
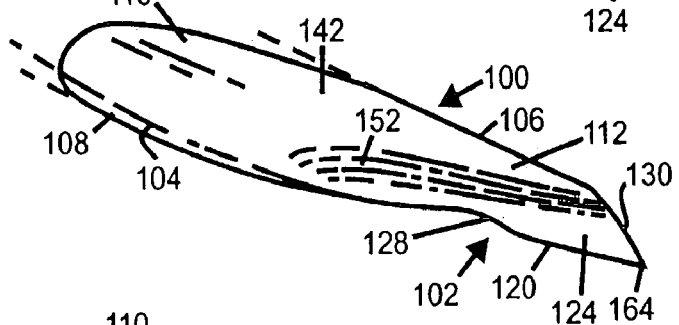

FIG. 7b shows an alternate embodiment in which tip droop 102 is located along the rearward half of the chord of foil 100. Droop leading edge 128 is seen to begin adjacent the mid chord position of tip portion 112 of foil 100. This embodiment permits outward spanwise flow conditions to occur around the forward region of tip portion 112 of foil 100 to enable flow to accelerate in an upward and inward direction above low pressure surface 142 of foil 100, preferably in an attached manner for increasing the total lift on foil 100. Tip droop 102 then redirects the fluid medium to flow in an inward spanwise manner as it flows around tip droop 102, thus dual cross flow conditions can exist at different positions along the chord of tip portion 112 of foil 100. In this embodiment, droop lower end 120 is swept downward and backward. Droop trailing edge 130 is also swept backward and downward.

Figure 7C:
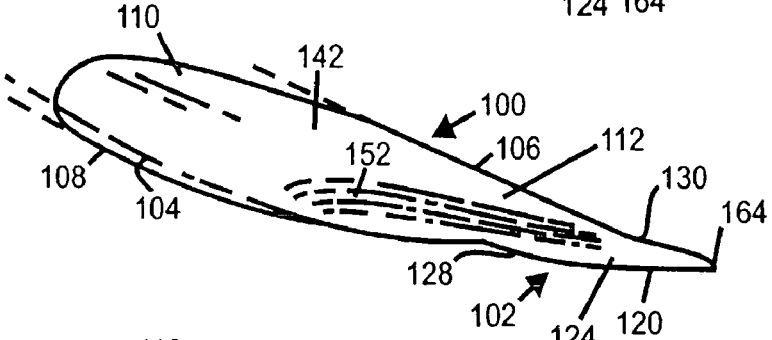

FIG. 7c shows an alternate embodiment in which tip droop 102 has a lower aspect ratio, has an increased rearward extension of droop trailing tip 164 is located at the rearward portion of tip portion 112 of foil 100. Reducing the aspect ratio and, or reducing the overall size of tip droop 102 can be used to create efficient inward cross flow conditions in the wake behind foil 100 with low drag incurrence while foil 100 is at very low angles of attack relative to its direction of movement (actual angle of attack) or relative to the induced flow conditions or apparent flow conditions existing around tip droop 102 and foil 100.

Figure 7D:
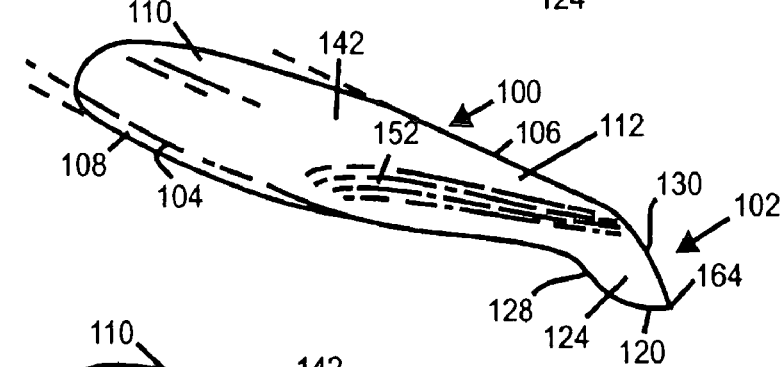

FIG. 7d shows an alternate embodiment in which foil tip 102 extends downward from the rearward portion of tip portion 112 of foil 100. In this embodiment, the aspect ratio of tip droop 102 is increased. In this embodiment, outward spanwise flow conditions can occur forward of tip droop 102 and inward spanwise flow can occur in the wake behind foil tip 102 and foil 100. In such situations, tip droop 102 can have an inward asymmetrical camber and, or a predetermined amount in divergent alignment that is arranged to create an inward lifting force relative to any outward spanwise flow conditions existing forward of and around foil tip 102.

Figure 7E:
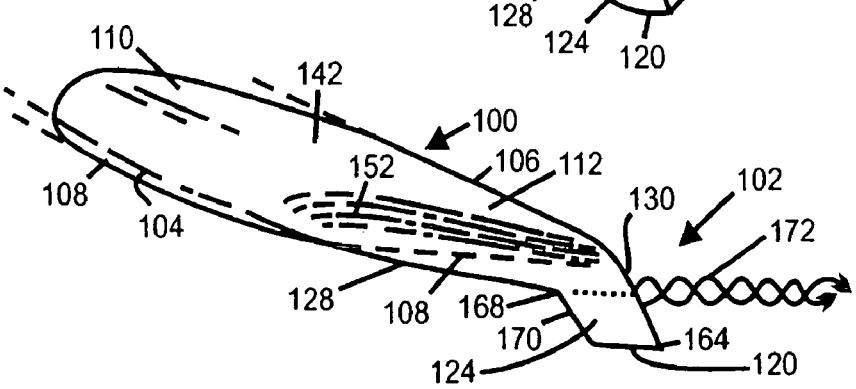

In the embodiment shown in FIG. 7e, droop leading edge 128 originates adjacent leading edge 104 of foil 100 and extends rearward and downward in a highly swept manner and then suddenly reduces its angle of sweep at a droop leading edge corner 168 to form a less swept leading edge 170. In this embodiment, less swept leading edge 170 forms a relatively sharp corner with droop lower end 120. The dual swept arrangement of droop leading edge 128 and less swept leading edge 170 is arranged to form an inward droop surface vortex 172 to form along the inward surface of tip droop 102 adjacent to leading edge corner 168. Tip droop 102 adjacent to droop leading edge 128 is arranged to have inward directed camber and, or a predetermined divergent alignment that is sufficient to cause vortex 172 to form along the inward surface of tip droop 102. Preferably, vortex 172 is arranged to have a direction of spin that is opposite that of a standard induced drag tip vortex. The dotted line shows the path of vortex 172 behind tip droop 102. Vortex 172 is purposely formed to promote attached flow conditions along the inward surface of tip droop 102. The size of vortex 172 may be small or large and may be formed along the inward droop surface of tip droop 102 or may be formed in the wake behind tip droop 102. The shapes of tip droop 102 shown in FIGS. 7a to 7c are a few examples of vast variations in shape, form and contour that can be used. Tip droop 102 may have any shape, size, contour, angle attack and orientation. Multiple vortex generators and tip foils may be used in any arrangement or combination. In alternate embodiments, vortices can also be created along outward droop surface 124.

Figure 8:
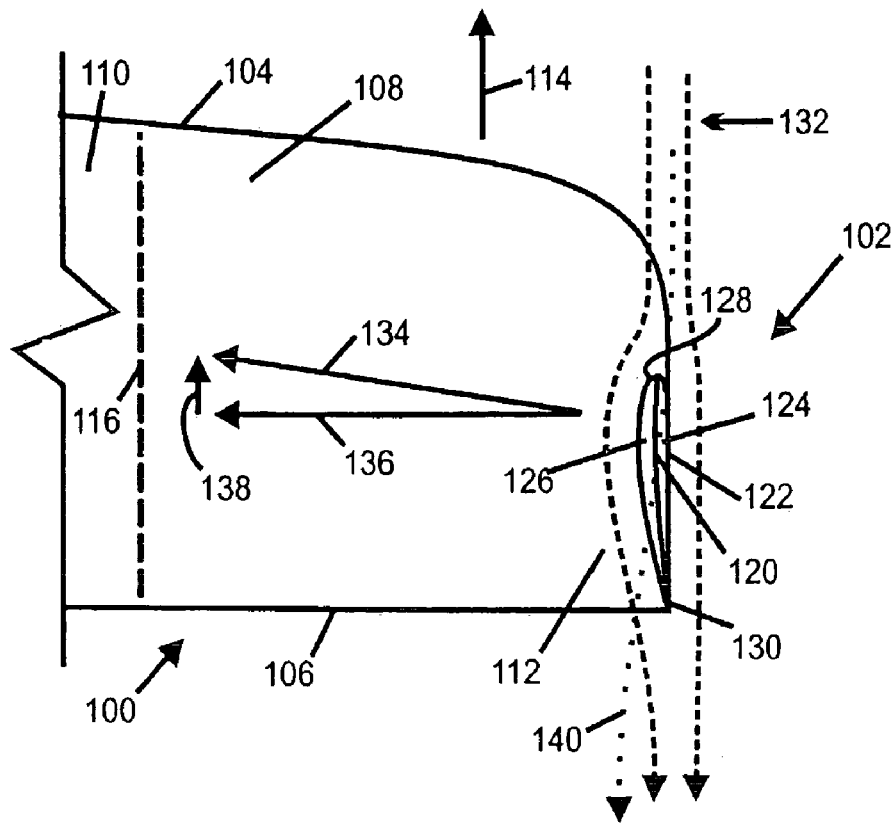
FIG. 8 shows a bottom view of a foil having a small foil shaped tip droop having inward camber.

FIG. 8 shows a bottom view of foil 100 in which tip droop 102 is reduced in size. In this embodiment, droop lower end 120 is seen to have be curved in a manner that increases in divergence toward droop trailing edge 130; however, droop lower end 120 may also be straight or may have any alignment, any degree of curvature, any shape or contour. Tip Droop 102 may be any size. Small dimensions can be used to minimize drag created by tip droop 102. At high Reynolds numbers, useful amounts of inward lift can be created by smaller vortex generating surfaces and foil shaped devices, particularly at low angles of attack such as during cruising. Inward spanwise flow 140 is seen to twist below the portion of oncoming flow 132 that flows around inward droop surface 126 to show that a counter vortex is forming which spins in the opposite direction of a standard induced drag tip vortex. The inward deflection of inward spanwise flow 140 shows that the outward spanwise flow associated with ordinary foil tips is reversed by using the methods of the present invention. In this embodiment, leading edge 104 of foil 100 located in front of tip droop 102 is seen to be convex curved; however, any shape may be used.

Figure 9:
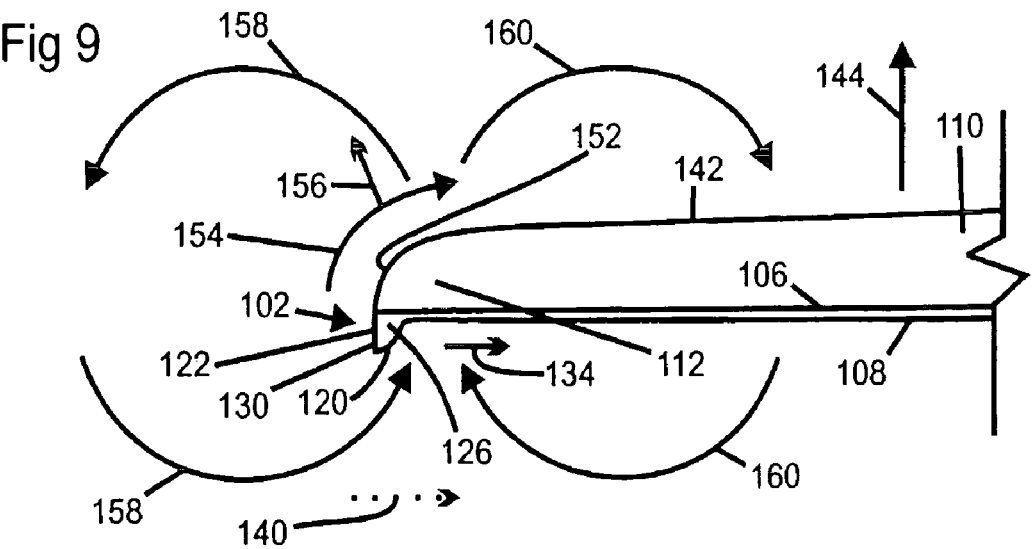
FIG. 9 shows a rear view of the foil of FIG. 8.

FIG. 9 shows a rear view of the embodiment in FIG. 8. In comparison to the rear view of FIG. 3, the rear view in FIG. 8 shows that in this embodiment, the size of tip droop 102 has been significantly reduced. Tip droop 102 can be reduced to any size and can be made sufficiently small to exist only within the boundary layer existing below high-pressure surface 108, to extend slightly above the boundary layer, or project any distance into the free stream below high pressure surface 108. The thickness between outward droop surface 124 and inward droop surface 126 is seen to be reduced as well; however, any thickness can be used. Tip droop 102 is a cambered vortex generator that is attached to the tip region of foil 100. In alternate embodiments, such a cambered vortex generator can be used along any surface whatsoever to create vortex flow along or behind such surface.

Figure 10:
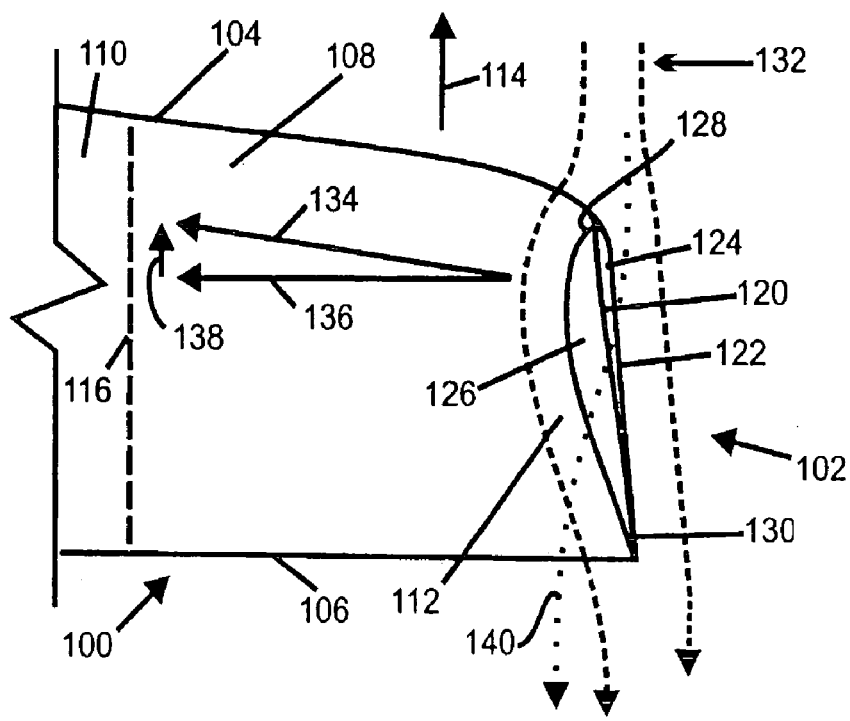
FIG. 10 shows a bottom view of a foil having a divergent tip and an inward cambered tip droop.
Figure 11:
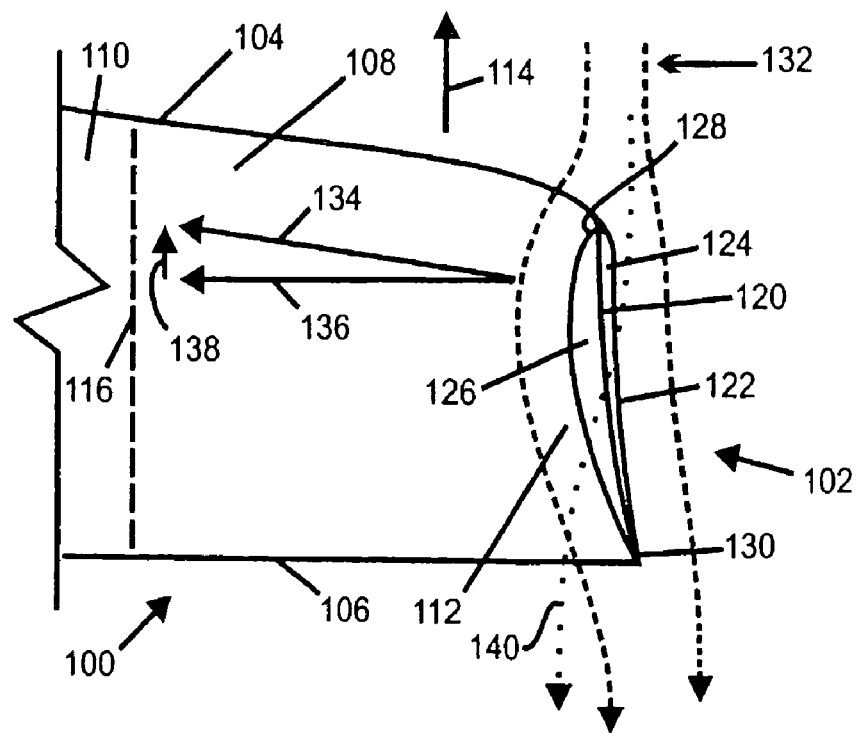
FIG. 11 shows a bottom view of a foil having a divergent tip and a tip droop having inward camber on both the inward droop surface and the outward droop surface.

FIG. 10 shows a bottom view of foil 100 in which tip droop 102 is oriented at a divergent angle relative to foil direction 114 and, or any spanwise flow conditions existing around tip droop 102. FIG. 11 shows the same view of an alternate embodiment in which the alignment of tip droop 102 increases in divergence in a rearward direction. The method of increasing the divergence of tip droop 102 in a rearward direction permits inward spanwise flow 140 to experience an increase in strength adjacent the rearward portions of tip portion 112 of foil 100. This important since undesirable outward directed spanwise flow conditions can increase in strength toward the rearward portions of tip portion 112 of foil 100, especially at increased angles of attack. The rearward increase in divergence of tip droop 102 permits such undesirable outward spanwise flow conditions to be controlled, reduced, neutralized, or reversed. The lower angle of divergence adjacent the forward portions of tip droop 102 permit profile drag and flow separation to be reduced for increased efficiency. Tip droop 102 is seen to have inward directed camber on both inward droop surface 126 and outward droop surface 124. In various embodiments, the forward portion of tip droop 102 can have an alignment that is convergent, straight, slightly divergent or significantly divergent while the rearward portions of tip droop 102 experience increased divergence, reduced divergence, significant alignment with foil direction 114, or even convergence. Any of these variations in alignment can be relative to foil direction 114 or to any spanwise flow conditions occurring around or near tip droop 102.

Figure 12:
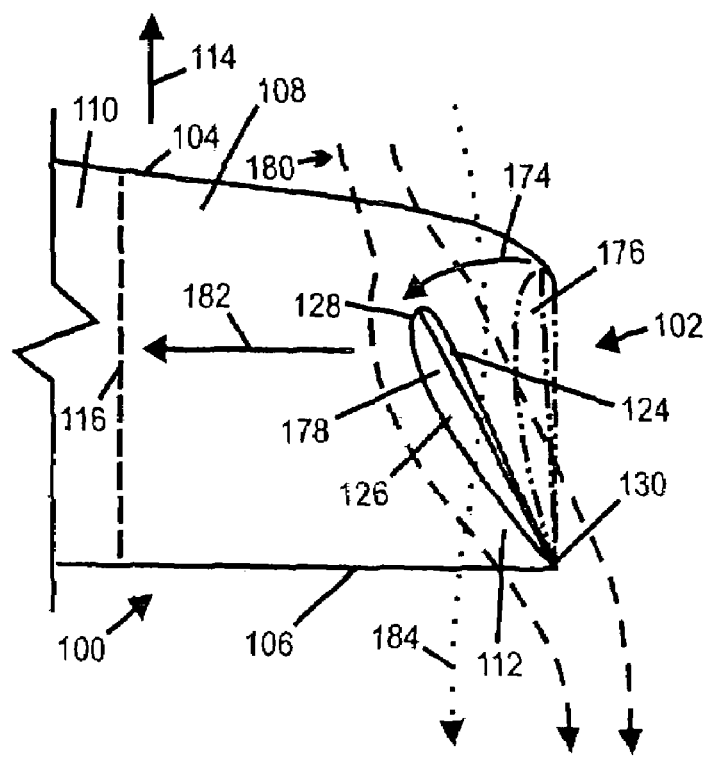
FIG. 12 shows a bottom view of a foil having an inward cambered vertical foil that may pivot around an axis that is normal to the plane of the foil.

FIG. 12 shows a bottom view of foil 100 in which tip droop 102 is pivotally connected to tip portion 112 around a vertical axis or an axis that is substantially normal to the plane of foil 100. In this embodiment, tip droop 102 is pivotally connected to tip portion 112 adjacent droop trailing edge 130; however, the location of a pivotal connection can be any location. Any suitable pivotal connection may be used including pins, hinges, pivotal couplings, or any other pivotal connection. Tip Droop 102 is seen to have pivoted through a predetermined range of motion 174 from a predetermined originating position 176 shown by broken lines to a pivoted position 178. In this case, originating position 176 can be used when foil 100 is at relatively low angles of attack and pivoted position 178 can be used at high angles of attack. In this case, foil 100 is oriented at a high angle of attack relative to foil direction 114 which causes an outward spanwise flow 180 to form which is shown by dotted lines flow around tip droop 102. The pivotal capability of tip droop 102 permits the alignment of tip droop 102 to be oriented relative to outward spanwise flow 180 to create an inward lift vector 182 and reestablishes an inward spanwise flow 184 shown by a dotted line. Preferably, the angled orientation of tip droop 102 can be made continuously adjustable or incrementally adjustable so that pivoted position 178 may have any desired angle relative to foil direction 114 and, or any spanwise flow conditions near or around tip portion 112 of foil 100. Continuous alignment adjustment can permit new spanwise flow conditions to be created and then the alignment can be further adjusted relative to the new spanwise flow conditions created, and so on for optimum efficiency and performance for a given lift generating task. Originating position 176 may have any alignment and, or location and pivoted position 178 may have any alignment and, or location.

Figure 13:
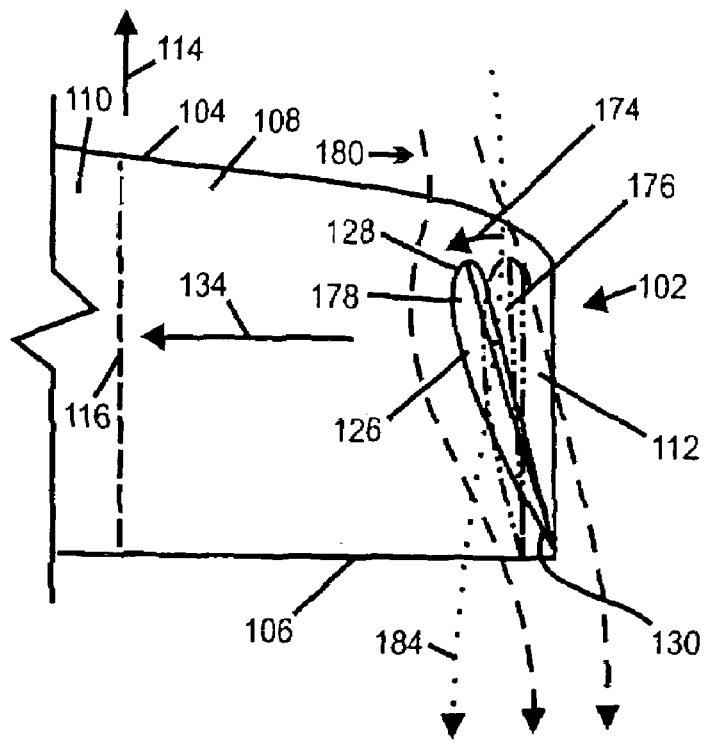
FIG. 13 shows a bottom view of an alternate embodiment foil having an inward cambered pivoting tip.

FIG. 13 shows a bottom view of foil 100 in which tip droop 100 is able to pivot around an axis 186 that is substantially normal to the plane of foil 100 and that is located along tip droop 102 at a predetermined position that is between droop trailing edge 130 and droop leading edge 128. In this embodiment, originating position 176 begins a location that is inward from tip portion 112 of foil 100.

FIG. 14 shows a bottom view of foil 100 in which tip droop 102 is pivotally connected to foil 100 around an axis 188 that is located at a position along tip portion 112 of foil 100 that corresponds to the region of greatest foil thickness on foil 100 in this embodiment. Tip droop 102 is seen to pivot around axis 188 to an orientation of increased divergence to foil direction 114. Tip droop 102 pivots from an originating position 190 to a pivoted position 192. A pivoting foil portion 194 is seen between tip portion 112 and droop trailing edge 130. Pivoting foil portion 194 has a trailing edge portion 196. Pivoting foil portion 194 preferably extends inside of foil 100 through an opening in tip portion 112. The portions of pivoting foil portion 194 located within foil 100 are shown with dotted lines to identify an inside originating position 198 and an inside pivoted position 200. Because axis 188 is near or at the region of maximum foil thickness on foil 100, the vertical thickness of foil 100 (normal to the plane of foil 100) continues to decrease between axis 188 and trailing edge 106 of foil 100. This allows tip portion 112 to have a relatively wide opening that originates at a location adjacent axis 188 and that tapers in vertical thickness toward trailing edge 106 of foil 100. This in turn allows pivoting foil 194 to have a slightly smaller shape of similar decreasing thickness between axis 188 and trailing edge portion 196 of pivoting foil 194, which is arranged to fit relatively snugly within the tapered cavity existing within the rearward region of tip portion 112 of foil 100. This allows pivoting foil 194 to have an efficient airfoil shape as it extends outward beyond tip portion 112 so that pivoting foil 194 my efficiently generate lifting forces with reduced levels of drag by becoming a swing wing extension of foil 100. Alternatively, pivoting foil 194 can have any thickness, airfoil shape, foil shape, degree of camber, any contour, or any type of connection to foil 100. The portions of tip droop 102 located inward of tip portion 112 of foil 100 may pivot across high pressure surface 108 of foil 100 in any manner. Tracks, glides, openings, movable couplings, flexible bushings or any type of device may be used to assist with efficient movement. Any method for increasing the efficiency of pivotal motion as well as for reducing parasitic drag may be used to maximize the methodologies of the present invention. Pivoting foil 194 can connected to foil 100 in any suitable manner. It is preferred that pivoting foil 194 has an efficient airfoil cross section for generating lift in the same direction as the lift created by foil 100 for a net increase in lift.

FIG. 15 shows a bottom view of an alternate embodiment in which tip droop 102 is arranged to pivot around an axis 202 that is oriented in a direction that is substantially normal to the plane of foil 100 and is located near droop leading edge 128. Foil 100 may have any foil shape, camber, or lack of camber. Tip droop 102 is seen to have pivoted from an originating position 208 to a pivoted position 210. Tip droop 102 is connected to a pivoting foil 204 having a trailing edge 206. In this embodiment, pivoting foil 202 extends inside of foil 100 through an opening in tip portion 112; however, pivoting foil 202 can also be attached to foil 100 in any manner. Dotted lines show the positions within foil 100 of pivoting foil 202 including an inside origination position 212 and an inside pivoted position 214. Pivoting foil 204 can have any thickness, airfoil shape, foil shape, degree of camber, any contour, or any type of connection to foil 100. It is preferred that pivoting foil 202 has a foil shape capable of generating lift in the same direction as the lift created by foil 100 for a net increase in lift on foil 100.

FIG. 16 shows a bottom view of an alternate embodiment in which tip droop 102 is connected to a pivoting foil 216 which extends inside tip portion 112 of foil 100 and pivots around an axis 218 which has an alignment that is substantially normal to the plane of foil 100. Pivoting foil 216 has a leading edge 220 and a trailing edge 222. In this embodiment, the location of axis 218 is arranged to be located at or near the region of maximum thickness of foil 100 (thickness occurring in a direction that is normal to the plane of foil 100) so that the cavity formed in tip portion 112 of foil 100 tapers in thickness from an area adjacent axis 218 toward leading edge 104 of foil 100 and from an area adjacent axis 218 toward trailing edge 106 of foil 100. This allows pivoting foil 216 to have a significantly similar foil shape and camber to that of foil 100 which can fit snugly within a foil shaped cavity along tip portion 112 of foil 100. This allows pivoting foil 216 to have an efficient airfoil section for generating lift in the same direction as the lift created by foil 100 for a net increase in lift on foil 100. Pivoting foil 216 can be any shape, size, aspect ratio, degree of rotation, angle of attack, thickness, thinness, contour, or plan form. Double ended arrows show an example of pivotal movement for pivoting foil 216. Pivoting foil 216 may pivot over any range, any direction and/or any angle.

In alternate embodiments, tip droop 102 can have an inward directed camber that has a maximum thickness at or near the middle of tip droop 102 while both droop leading edge 128 and droop trailing edge 130 are made to have the same shape. Axis 218 could also be located at the middle of the chord of foil 100 and could have a matching or similar airfoil shape to pivoting foil 216. Pivoting foil 216 could also be arranged to pivot to divergent and convergent alignments. This would be useful on rotating wing aircraft in which the rotating wing makes a transition from being a rotating wing to a fixed wing oriented at a spanwise orientation to the aircraft fuselage. This would allow the inward cambered tip droop on the backward moving rotating wing to transition from a rearwardly directed divergence during rotation to a forward directed angle of divergence as rotation is stopped and the rotating wing becomes a fixed wing during flight. Maximum efficiency can be attained in both profiles.

In any of the pivoting embodiments of an inward cambered tip droop can be arranged to make large or fine tune adjustments to spanwise flow conditions as well as to create upwash conditions behind a foil. These adjustments can be made manually or can be made automatically with predetermined gearing, coupling, hydraulic control or any other type of control. Computers can be used to establish efficient alignments relative to pre-tested conditions or relative to feedback from angle of attack indicators, stall sensors, flow speed sensors, fluid pressure sensors, power consumption sensors or any other type of feed back device. Pivoting can also be linked or coupled to predetermined control surfaces to increase efficiency during maneuvers, turns, climbs, ascents, descents, simple combination maneuvers as well as highly complex evasive maneuvers and attack maneuvers for military applications. For example, one method for coupling control surfaces on an aircraft wing would be to enable counter vortex generating tip droops to pivot outward on both wing tips when the elevator or elevons are angled for climbing, to pivot inward on both wing tips during dives, to pivot outward on the right wingtip and/or inward on the left wingtip when ailerons or elevons or rudder is used angled for turning right and vice versa, to have all of these features mixed with mechanical connections, electronics or computers. In helicopter rotor and propeller applications which have devices for varying the angle of attack, pivoting counter vortex generators at the tips of such rotating foils can be coupled in any suitable manner to the angle of attack of the rotating foils so that spanwise flow is controlled and, or upwash fields are created. The pivotal alignment of the vortex generators can also be coupled to the flow speed or rotations per minute of a rotating wing, helicopter rotor, propeller, boat propeller, fan blade, or nacelle. The alignment of tip vortex generators can also be adjusted on any type of non-rotating foils during use. These include rudders, keels, skegs, fins, hydrofoils, stabilizers, flaps, control surfaces, aileron ends, rudder ends, flap ends, canards, reciprocating foils, propulsion blades, fluid mixing blades, impellers or any other foil type device.

FIG. 17 shows a bottom view of an alternate embodiment. Tip droop 102 is seen to have pivoting droop portion 224 that pivots around an axis 226 which has an alignment that is substantially normal to the plane of foil 100 (the plane of foil 100 may include either the opposing surfaces of foil 100, the mean chord line within foil 100). Pivoting droop portion. 224 has a curved leading edge 228 which extends into a concave curved cavity in the rear portion of tip droop 102 near axis 228 to provide a streamlined connection. Any method or manner of connection between portion 224 and droop 102 can be used. Portion 224 has a trailing edge 230, an outward droop surface 232, an inward droop surface 234 and a droop lower end 236. Portion 224 is connected to a pivoting foil 238 having a trailing edge 240 and a lower surface 242. Pivoting foil 238 preferably extends inside tip portion 112 of foil 100 and can be seen by dotted lines to have an inward originating position 244 and an inward pivoted position 246. Portion 224 is seen have pivoted from an originating position 248 to a pivoted position 250. Pivoted position 252 is arranged to create an adjustable increase in camber to tip droop 102 in a similar manner that trailing edge flaps create increased camber on an airplane wing for increased lift. In alternate embodiments, an size, shape or number of flap type devices can be used along any location of tip droop 102. Portion 224 can be rotated outward during increased angles of attack or to combat, counter or reverse any increase outward spanwise flow conditions. In alternate embodiments, tip droop 102 can be pivotally connected to foil 100 in any manner and then portion 224 can be pivotally connected to tip droop 102 in any manner. This could permit further variation in camber and angle of attack for tip droop 102. In alternate embodiments, tip droop 102 and portion 224 can be of any size, shape, proportion, arrangement, configuration, shape or contour. Additional pivoting portions can be attached to portion 224 in any manner. Also, portion 224 can be used without tip droop 102 so that portion 224 is the only inward lifting foil.

FIG. 18 shows a perspective view of the embodiment shown in FIG. 17. Portion 224 is seen to be in pivoted position 250. Preferably, portion 224 forms a streamline connection to foil 100. Lower surface of portion 224 is seen by a dotted line behind outward droop surface 232 of portion 224. High pressure surface 108 of foil 100 is seen with a dotted line behind tip droop 102 and portion 224.

SUMMARY, RATIFICATIONS, AND SCOPE

Accordingly, the reader will see that the methods of the present invention can be used to improve the performance of a foil.

The reader will also see that the present invention can be used to control, reduce or reverse spanwise flow conditions adjacent the tip portion of a foil type device. Furthermore, the designs and methods of the present invention offer additional advantages in that they:

(a) provide reduced profile drag;
(b) provide reduced size and weight;
(c) provide improved control over spanwise flow;

(d) provide reduced levels of parasitic drag, flow separation and transitional flow;

(e) provide increased pressure differential for permitting reduced angles of attack to be used;

(f) provide variable control over changes in spanwise flow conditions; and (g) provide increased efficiency for an increase net performance and lift.

Although the description above contains many specificities, these should not be construed as limiting the scope of the invention but as merely providing illustrations of some of the presently preferred embodiments of this invention. For example, alternate embodiments can include any combination or combinations of any embodiment, feature, description, portion, or method in the above description and drawings.

In alternate embodiments, flow separation or vortex formation may be purposely formed around any of the surfaces or edges of a tip droop. For example, vortex flaps, vortex generators, turbinators, impressions, dimples, holes, edges, ridges, swept edges, angled edges, obtuse edges, acute edges, swept leading edges, varied degrees of sweep, sharp corners may be used to enhance the performance of a tip droop. Vortices can be created to purposely create flow separation at a position that is sufficiently upstream to permit the fluid medium to become reattached at a downstream position along a tip droop. This can be used to delay stall conditions on surfaces and to maintain attached flow conditions. Vortices may also be generated to create curved flow paths over relatively flat or relatively thin foil sections. Vortex generators can also be used as passive boundary layer control devices to reduce the thickness of the boundary layer around a tip droop. Vortex generators connected to the tip droop can be used to prevent larger scale flow separation from occurring.

In alternate embodiments, a dihedral rise can be used instead of, or in conjunction with a tip droop. Such a dihedral rise would be arranged to have an outward lift generating camber arranged to create an outward lifting force along the outer surface of a dihedral rise. This would create an outward spanwise flow condition above the foil tip adjacent to the low pressure surface of the foil to create a counter vortex in the wake behind the trailing edge of the foil. Such a dihedral rise may have any shape, size, angle of attack, or configuration.

Any method for controlling the movement, position, alignment, angle of attack may be used. Hydraulics, pulleys, gears, shafts, rods, push rod, pull rods, wires, electronic motors, or any other type of controlling device may be used. Also, inward cambered tip droops can be arranged to pivot around a substantially chordwise axis or a divergent axis. The methods of the present invention may be used on any foil type device in any fluid medium.

In addition, any of the embodiments and individual variations discussed in the above description may be interchanged and combined with one another in any desirable order, amount, arrangement, and configuration. Accordingly, the scope of the invention should not be determined not by the embodiments illustrated and described, but by the appended claims and their legal equivalents.

I claim:

1. A method for providing a foil, comprising:
   (a) providing a foil having an inward portion, a tip, a chordwise direction, a relatively higher pressure foil surface, a relatively lower pressure foil surface, a leading edge and a trailing edge, said foil having relative movement to a fluid medium that is arranged to permit said foil to experience lift generation that produces a foil lifting force on said foil having a direction that is substantially from said relatively higher pressure surface toward said relatively lower pressure surface, said tip having a tendency to create an induced drag vortex within said fluid medium in the wake behind said foil; and
   (b) providing a vortex generator connected to said foil near said tip, said vortex generator having a substantially streamwise alignment, said vortex generator being arranged to generate a counter vortex within said fluid medium in said wake behind said vortex generator that has a direction of spin that is opposite of said induced drag vortex, said vortex generator having a relatively lower pressure generator surface and a relatively higher pressure generator surface that are arranged to create a predetermined generator lifting force on said vortex generator, said vortex generator being oriented to substantially avoid creating a significant reduction in said foil lifting force on said foil during said lift generation, said substantially streamwise alignment being at an angle to said chordwise direction to generate said counter vortex;
   (c) adjusting said substantially streamwise alignment to control the strength of said counter vortex so as to create a reduction in the strength of said induced drag vortex.

2. The method of claim 1 wherein said vortex generator is arranged to generate said counter vortex in a manner effective to create a net increase in the efficiency of said lift generation of said foil.

3. The method of claim 1 wherein said predetermined generator lifting force is arranged to be oriented in a predetermined direction relative to said direction of said foil lifting force that is capable of minimizing the formation of a negative lifting force on said vortex generator that could significantly oppose said foil lifting force as said vortex generator generates said counter vortex, said predetermined direction being capable of increasing the efficiency of said lift generation of said foil.

4. The method of claim 3 wherein said predetermined direction of said predetermined generator lifting force is arranged to be substantially perpendicular to said direction of said foil lifting force.

5. The method of claim 1 wherein at least one portion of said vortex generator is arranged to generate a forward directed component of said predetermined generator lifting force.

6. The method of claim 1 wherein at least one portion of said vortex generator is arranged to create beneficial lifting force that is oriented in said direction of said foil lifting force during said lift generation of said foil.

7. The method of claim 1 wherein said vortex generator has a predetermined profile relative to said relative movement within said fluid medium, and the combination of said predetermined profile, said predetermined generator lifting force and said counter vortex are arranged to create an overall net increase in the efficiency of said foil during said lift generation.

8. The method of claim 1 further including providing said vortex generator with a predetermined profile relative said fluid medium that creates a predetermined generator profile drag on said foil during said relative movement, and selecting said predetermined profile of said vortex generator so as to permit said counter vortex to create an increase in the efficiency of said foil that exceeds said profile drag so as to create a net increase in said efficiency of said lift generation of said foil.

9. The method of claim 1 wherein said tip of said foil has a tendency to create an outward directed cross flow condition within said fluid medium relative to said relatively higher pressure foil surface near said tip, and said vortex generator is arranged to generate said counter vortex in manner effective to permit the rotation of said fluid medium within said counter vortex to create a net reduction in said outward cross flow condition relative to said tip.

10. The method of claim 9 wherein said net reduction in said outward spanwise expansion of said relatively higher pressure is sufficient to create an increase in the efficiency of said lift generation of said foil.

11. The method of claim 1 wherein said vortex generator is arranged to generate said counter vortex in a manner sufficient to create an upwash field within said fluid medium in said wake behind at least one portion of said foil, said upwash field is arranged to occur substantially in the direction of said foil lifting force during said lift generation of said foil.

12. The method of claim 1 wherein said counter vortex is arranged to form sufficiently close to said induced drag vortex in said wake to cause a reduction in the strength of said induced drag vortex.

13. The method of claim 1 wherein a downwash field is created by said induced drag vortex in said wake behind said foil, said downwash field extending in a substantially opposite direction to said direction of said lift generation, said vortex generator is arranged to generate said counter vortex with sufficient strength to create a net reduction in said downwash field.

14. The method of claim 1 wherein said vortex generator is arranged to generate said counter vortex in an amount sufficient to enable said counter vortex to move said induced drag tip vortex to a position within said wake that is inward of vortex generator.

15. The method of claim 1 wherein said vortex generator comprises an anhedral tip droop that extends downward below said relatively higher pressure foil surface.

16. The method of claim 15 wherein said relatively lower pressure generator surface is an inward surface on said anhedral tip droop, at least one portion of said inward surface being oriented at a divergent alignment relative to said relative movement of said fluid medium, said vortex generator being arranged to generate said counter vortex in a manner sufficient to create a net inward deflection within said fluid medium relative to said relatively higher pressure foil surface, and said net inward deflection being arranged to create an increase the efficiency of said lift generation.

17. The method of claim 15 wherein said relatively lower pressure generator surface comprises an inward surface relative to said foil and said relatively higher pressure generator surface comprises an outward surface relative to said foil, said inward surface being convexly curved along a chordwise direction and said outward surface being relatively straighter than said inward facing surface along said chordwise direction.

18. The method of claim 15 wherein said relatively lower pressure generator surface comprises an inward surface relative to said foil and said relatively higher pressure generator surface comprises an outward surface relative to said foil, said inward surface being arranged to be convexly curved along a chordwise direction and at least one portion of said outward surface being arranged to be concavely curved along said chordwise direction.

19. The method of claim 15 wherein said anhedral tip droop is curved in an outward and downward direction relative to said tip of said foil.

20. The method of claim 1 wherein said vortex generator is arranged to be pivotable.

21. The method of claim 1 wherein at least one movable flap member is connected to said vortex generator.

22. The method of claim 1 wherein at least one portion of said vortex generator is arranged to pivot around an axis that is substantially parallel to the direction of said foil lifting force of said foil.

23. A method for providing a foil, comprising:
(a) providing a foil having an inward portion, a tip, a relatively higher pressure foil surface, a relatively lower pressure foil surface, a leading edge and a trailing edge, said foil having relative movement to a fluid medium that is arranged to permit said foil to experience lift generation that produces a foil lifting force on said foil having a direction that is substantially directed from said relatively higher pressure surface toward said relatively lower pressure surface;
(b) providing an anhedral tip droop connected to said tip, said tip droop extending below said relatively higher pressure foil surface in a substantially vertical direction that is significantly perpendicular to the spanwise alignment of said foil, said tip droop having a lower end, a tip droop leading edge, a tip droop trailing edge, an inward surface and an outward surface; and
(c) arranging said tip droop to be able to pivot around a substantially vertical axis relative to the plane of said foil, at least one pivoting portion of said tip droop being arranged to pivot to an outward position that is outward of said tip of said foil to form a gap between said at least one pivoting portion and said tip of said foil, said tip droop having a movable foil portion that is substantially parallel to the plane of said foil and is arranged to substantially fill said gap between said at least one movable foil portion of said tip droop and said tip of said foil when said tip droop is pivoted toward said outward position.

24. The method of claim 23 wherein said tip of said foil has a tendency to create an induced drag vortex within said fluid medium in the wake behind said foil during said lift generation, said anhedral tip droop having at least one counter vortex generating member that is arranged to generate a counter vortex within said fluid medium in said wake behind said foil that has a direction of spin that is opposite to said induced drag vortex.

25. The method of claim 24 wherein said at least one counter vortex generating member is arranged to generate said counter vortex in a manner effective to create a net increase in the efficiency of said lift generation of said foil.

26. The method of claim 24 wherein said at least one counter vortex generating member creates a predetermined generator lifting force that is arranged to be oriented in a predetermined direction relative to said direction of said foil lifting force that is capable of minimizing the formation of a negative lifting force on said vortex generator that could significantly oppose said foil lifting force as said at least one counter vortex generating member generates said counter vortex.

27. The method of claim 26 wherein said predetermined direction of said predetermined generator lifting force is arranged to be substantially perpendicular to said direction of said foil lifting force.

28. The method of claim 26 wherein at least one portion of said at least one counter vortex generating member is arranged to generate a forward directed component of said predetermined generator lifting force.

29. The method of claim 26 wherein said at least one counter vortex generating member has a predetermined profile relative to said relative movement within said fluid medium, and the combination of said predetermined profile, said predetermined generator lifting force and said counter vortex are arranged to create an overall net increase in the efficiency of said foil during said lift generation.

30. The method of claim 26 wherein said tip of said foil has a tendency to create an outward spanwise directed cross flow condition within said fluid medium relative to said relatively higher pressure foil surface near said tip, and said vortex generator is arranged to generate said counter vortex in manner effective to permit the rotation of said fluid medium within said counter vortex to create a net reduction in said outward cross flow condition relative to said tip.

31. The method of claim 30 wherein said net reduction in said outward cross flow condition of said relatively higher pressure is sufficient to create an increase in the efficiency of said foil.

32. The method of claim 26 wherein said at least one counter vortex generating member is arranged to generate said counter vortex in a manner sufficient to create an upwash field within said fluid medium in said wake behind at least one portion of said foil, said upwash field is arranged to occur substantially in the direction of said foil lifting force during said lift generation of said foil.

33. The method of claim 26 wherein said counter vortex is arranged to form sufficiently close to said induced drag vortex in said wake to cause a reduction in the strength of said induced drag vortex.

34. The method of claim 26 wherein a downwash field is created by said induced drag vortex in said wake behind said foil, said downwash field extending in a substantially opposite direction to said direction of said lift generation, said at least one counter vortex generating member is arranged to generate said counter vortex with sufficient strength to create a net reduction in said downwash field.

35. The method of claim 26 wherein said at least one counter vortex generating member is arranged to generate said counter vortex in an amount sufficient to enable said counter vortex to move said induced drag tip vortex to a position within said wake that is inward of vortex generator.

36. The method of claim 26 wherein said predetermined direction is arranged to increase the efficiency of said foil.

37. The method of claim 26 wherein at least one portion of said inward surface being oriented at a divergent alignment relative to said relative movement of said fluid medium, said at least one counter vortex generating member being arranged to generate said counter vortex in a manner sufficient to create a net inward deflection within said fluid medium relative to said relatively higher pressure foil surface, and said net inward deflection being arranged to create an increase the efficiency of said lift generation.

38. The method of claim 24 wherein a trailing portion of said tip droop is arranged to pivot.

39. The method of claim 24 wherein at least one portion of said at least one counter vortex generating member is arranged to create a beneficial lifting force that is oriented substantially in said direction of said foil lifting force during said lift generation of said foil.

40. The method of claim 24 further including providing said at least one counter vortex generating member with a predetermined profile relative said fluid medium that creates a predetermined generator profile drag on said foil during said relative movement, and selecting said predetermined profile of said at least one counter vortex generating member so as to permit said counter vortex to create an increase in the efficiency of said foil that exceeds said profile drag so as to create a net increase in said efficiency of said lift generation of said foil.

41. The method of claim 23 wherein said inward surface is convexly curved along a chordwise direction and said outward surface is less curved in said chordwise direction than said inward facing surface along said chordwise direction.

42. The method of claim 41 wherein said anhedral tip droop is curved in an outward and downward direction relative to said tip of said foil.

43. A method for providing a foil, comprising:
(a) providing a foil having an inward portion, a tip, an upper surface, a lower surface, a foil leading edge and a foil trailing edge, said foil having a plane of said foil that extends between said foil leading edge and said foil trailing edge, said foil having relative movement to a fluid medium that is arranged to permit said foil to experience lift generation that produces a foil lifting force on said foil having a lift direction that is substantially directed from said relatively lower surface toward said upper surface, said foil having a tendency to create an induced drag vortex within said fluid medium in the wake behind said foil trailing edge that creates a drag inducing downwash field within said fluid medium in said wake behind said foil trailing edge that increases the net total drag created on said foil during said lift generation;
(b) providing a winglet connected to said foil near said tip that extends in a substantially vertical direction away from the said plane of said foil, said vertical winglet having a root portion, an outward surface, an inward surface, an outer end, a winglet leading edge, a winglet trailing edge, and a midpoint of said winglet that is midway between said winglet leading edge and said winglet trailing edge; and
(c) arranging said winglet to experience pivotal movement around a substantially vertical axis relative to the plane of said foil to a predetermined angle of attack relative to the chordwise direction of said foil near said tip and, said substantially vertical axis being sufficiently spaced from said midpoint of said winglet to permit said midpoint of said winglet to experience significant spanwise movement relative to said foil during said pivotal movement, wherein both said winglet and said predetermined angle of attack create a net counter vortex pattern that rotates in the opposite direction of said induced drag vortex in said wake behind said foil trailing edge, said net counter vortex pattern is arranged to be sufficiently strong enough relative to the strength of said induced drag vortex to create a net reduction in said net total drag on said foil when said winglet has pivoted to said predetermined angle of attack relative to said chordwise direction of said foil.

44. The method of claim 43 wherein said substantially vertical axis is located sufficiently closer to said winglet leading edge than said winglet trailing edge to cause said winglet trailing edge to experience a greater amount of said spanwise movement relative to said foil than said winglet leading edge during said pivotal movement.

45. The method of claim 43 wherein said substantially vertical axis is located sufficiently closer to said winglet trailing edge than said winglet leading edge to cause said winglet leading edge to experience a greater amount of said spanwise movement relative to said foil than said winglet trailing edge during said pivotal movement.

46. The method of claim 43 wherein said upper and lower surfaces being opposing surfaces, said winglet being a substantially independent pivoting winglet and said substantially independent pivoting winglet being arranged to extend vertically away from only one of said opposing surfaces but not the other of said opposing surfaces in an amount effective to permit said substantially independent pivoting winglet to substantially generate only said net counter vortex pattern that rotates in said opposite direction of said induced drag vortex of said foil while simultaneously avoiding creating a significantly strong drag inducing vortex that spins in the same direction of said induced drag vortex.

47. The method of claim 43 wherein said winglet has a predetermined range of pivotal movement relative to said foil, and a movable foil portion that is substantially parallel to said plane of said foil is connected to said winglet and is arranged to substantially prevent the formation of a spanwise gap between said winglet and said tip of said foil when said tip droop is pivoted across said predetermined range of pivotal motion.

48. A method for providing a foil, comprising:
(a) providing a foil having an inward portion, a tip, opposing surfaces including a relatively higher pressure foil surface; and a relatively lower pressure foil surface, a leading edge, a trailing edge, and a plane extending between said leading and trailing edges, said foil having relative movement to a fluid medium that is arranged to permit said foil to experience lift generation that produces a foil lifting force on said foil having a direction that is substantially from said relatively higher pressure surface toward said relatively lower pressure surface, said tip having a tendency to create an induced drag vortex within said fluid medium in the wake behind said foil;
(b) providing a vortex generator connected to said foil near said tip, said vortex generator having a substantially streamwise alignment, said vortex generator having at least one relatively stationary foil shaped portion that remains relatively stationary during use and said vortex generator having at least one movable foil shaped portion that is arranged to experience a predetermined range of pivotal motion around a predetermined axis that is substantially perpendicular to said relatively higher pressure foil surface, said at least one movable foil shaped portion extending significantly away from only one of said opposing surfaces to a significant vertical distance from said one of said opposing surfaces, said at least one predetermined region of said vortex generator being arranged to generate a counter vortex within said fluid medium in said wake behind said vortex generator that has a direction of spin that is opposite of said induced drag vortex, and providing a movable foil portion that is substantially parallel to said plane of said foil and is arranged to substantially prevent the formation of a spanwise gap between said winglet and said tip of said foil when said tip droop is pivoted across said predetermined range of pivotal motion; and
(c) arranging said at least one predetermined region of said vortex generator to generate said counter vortex with sufficient strength to create a net reduction in the strength of said induced drag vortex.

49. A method for providing a foil, comprising:
(a) providing a foil having an inward portion, a tip, opposing surfaces that include a relatively higher pressure foil surface; and a relatively lower pressure foil surface, a leading edge and a trailing edge, said foil having relative movement to a fluid medium that is arranged to permit said foil to experience lift generation that produces a foil lifting force on said foil having a direction that is substantially from said relatively higher pressure surface toward said relatively lower pressure surface, said tip having a tendency to create an induced drag vortex within said fluid medium in the wake behind said foil; and
(b) providing a vortex generator connected to said foil near said tip, said vortex generator having a substantially streamwise alignment, said vortex generator being arranged to generate a counter vortex within said fluid medium in said wake behind said vortex generator that has a direction of spin that is opposite of said induced drag vortex, said vortex generator having a relatively lower pressure generator surface and a relatively higher pressure generator surface that are arranged to create a predetermined generator lifting force on said vortex generator, said vortex generator being oriented to substantially avoid creating a significant reduction in said foil lifting force on said foil during said lift generation, said vortex generator having at least one independently pivoting vortex generator member that extends significantly away from only one of said opposing surfaces and is arranged to experience pivotal motion around a substantially vertical axis relative said one of said opposing surfaces so as to not create a significant winglet induced drag vortex that spins in the same direction of said induced drag vortex of said foil while generating said counter vortex.

50. The method of claim 49 wherein said at least one independently pivoting vortex generator member having a vortex generator leading edge, a vortex generator trailing edge, and a longitudinal midpoint between said vortex generator leading edge and said vortex generator trailing edge, said vertical axis being disposed in an area between said vortex generator leading edge and said longitudinal midpoint.

51. The method of claim 50 wherein said at least one independently pivoting vortex generator member has a predetermined range of pivotal movement relative to said foil, and a movable foil portion that is substantially parallel to said plane of said foil is connected to said at least one independently pivoting vortex generator member and is arranged to substantially prevent the formation of a spanwise gap between said winglet and said tip of said foil when said tip droop is pivoted across said predetermined range of pivotal motion.

* * * * *